United States Patent [19]

Kelly

[11] 4,379,553
[45] Apr. 12, 1983

[54] BOWLING LANE WITH FIRE RETARDANT DECORATIVE SURFACE

[75] Inventor: Peter B. Kelly, Pasadena, Tex.

[73] Assignee: General Electric Company, Schenectady, N.Y.

[21] Appl. No.: 315,972

[22] Filed: Oct. 28, 1981

Related U.S. Application Data

[63] Continuation of Ser. No. 59,215, Jul. 20, 1979, abandoned.

[51] Int. Cl.$^3$ .................. A63P 1/04; B32B 17/02; B32B 17/12; B32B 21/10
[52] U.S. Cl. ............................ 273/51; 156/61; 156/281; 156/306.6; 156/307.4; 428/204; 428/207; 428/211; 428/237; 428/239; 428/241; 428/242; 428/244; 428/247; 428/249; 428/438; 428/526; 428/528; 428/529; 428/530; 428/531; 428/535; 428/920
[58] Field of Search .......... 428/204, 207, 211, 237, 428/239, 241, 242, 244, 247, 249, 438, 526, 528, 529, 530, 531, 535, 920; 273/51; 156/61, 281, 307.4, 306.6

[56] References Cited

U.S. PATENT DOCUMENTS

| | | | |
|---|---|---|---|
| 2,531,168 | 11/1950 | Synder | 273/51 |
| 2,605,205 | 7/1952 | Patterson et al. | 154/139 |
| 2,816,851 | 12/1957 | Arledter | 154/47 |
| 3,135,643 | 6/1964 | Michl | 161/79 |
| 3,372,131 | 3/1968 | Rohlfs et al. | 260/17.3 |
| 3,373,070 | 3/1968 | Fuerst | 161/79 |
| 3,373,071 | 3/1968 | Fuerst | 161/79 |
| 3,383,274 | 5/1968 | Craig | 161/162 |
| 3,674,596 | 7/1972 | McMinimy | 156/321 |
| 3,874,990 | 4/1975 | Surdyk | 161/261 |
| 4,039,645 | 8/1977 | Coyle | 264/118 |
| 4,074,015 | 2/1978 | Franz et al. | 428/526 |
| 4,231,573 | 11/1980 | Kelly . | |
| 4,307,883 | 12/1981 | Kelly . | |
| 4,336,937 | 6/1982 | Kelly . | |
| 4,337,290 | 6/1982 | Kelly et al. . | |
| 4,337,291 | 6/1982 | Kelly . | |

Primary Examiner—James C. Cannon
Attorney, Agent, or Firm—Hedman, Casella, Gibson & Costigan

[57] ABSTRACT

An improvement in a bowling lane having a decorative laminate surface which improvement comprises incorporating into the core of the laminate a plurality of alternating layers of glass cloth and crepe paper, each core layer being impregnated with a thermosetting resin and an organic fire retardant material, contiguous and adjacent core layers being interlaminarly bonded to one another.

25 Claims, No Drawings

BOWLING LANE WITH FIRE RETARDANT DECORATIVE SURFACE

This is a continuation of application Ser. No. 59,215 filed July 20, 1979, and now abandoned.

BACKGROUND OF THE INVENTION

1. Field of Invention

This invention relates to new and improved laminates for bowling lane structures. More particularly, it relates to new and improved fire retardant bowling lane surfaces having high impact resistance.

2. Description of the Prior Art

Standard bowling lanes are often constructed of suitably finished hardwood blocks or planking. In such a lane bed, usually about 41 to 42 inches wide, the construction typically consists of from about 39 to 42 maple planks or boards about one inch thick laid edgewide in line with the longitudinal axis of the lane. The surface of the lane is made flat and coated with varnish or lacquer which is then treated as with mineral oil to reduce wear and adjust the coefficient of friction or slippage of the surface in order to produce uniform action and control of the bowling ball. The surface finish consists typically of a nitrocellulose or polyurethane lacquer which can be treated with plasticizers and other additives to provide with the oil treatment the desired wear and slippage or friction characteristic.

While wooden lanes have been in use for many years, they are subject to a number of deficiencies which have defied correction. For example, present wooden lanes can be easily and severely damaged in the areas of ball release and at the pin deck. Such damage in the ball release area is intensified by lofted bowling balls which, upon impact, dent the lacquered and oiled wooden surface. Even normal releases of the ball damage the lane although to a lesser degree. Surface damage in the pin deck area is primarily caused by contact of the struck pins with the surface. Under ordinary circumstances, standard bowling lanes are inspected and often sanded and refinished on an annual basis. Such refinishing is necessary in order to provide uniformity of all lanes so that comparable performance and scoring can be attained insofar as these factors are controlled by the physical condition of the bowling lane itself as opposed to the skill of the bowler. Moreover, wooden lanes pose a potential fire hazard since they are combustible unless treated and are subject in normal usage to cigarette butts and the like by bowlers. Treating wooden lanes to render them flame retardant has been difficult and costly due to the recognized incompatability between adhesives and fire retardants.

Materials other than wood have been suggested for use in bowling lanes. For example, U.S. Pat. No. 2,531,168 teaches a top surface layer for bowling alleys formed of laminated plastic compounds such a phenolic, vinyl, acrylic, cellulose acetate, etc. And U.S. Pat. No. 3,014,722 discloses bowling alley lanes formed of sections of laminated fibrous sheet material plies. Other materials have also been disclosed in U.S. Pat. No. 3,670,049 (a moisture curable polyurethane coating composition suitable for finishing bowling lanes); U.S. Pat. No. 3,025,060 (metal bowling alley lanes); U.S. Pat. No. Re. 25,496 (granite as a material for fabricating bowling alley lanes); U.S. Pat. No. 2,679,396 (hard rubber as a bowling alley lane material); and U.S. Pat. No. 2,193,468 (grasslike carpet useful in covering a game alley). None of these wood substitutes have proven to be commercially acceptable and wood lanes predominantly remain the materials in common usage today.

Japanese Application No. SHO-50-111020 laid open for inspection on May 18, 1976 as Publication No. SHO-51-56548, corresponds to U.S. patent application Ser. No. 506,069, filed Sept. 16, 1974, now abandoned, (the disclosure of which was carried forward in U.S. patent application Ser. No. 926,604 filed July 21, 1978 (hereinafter the '604 application), now U.S. Pat. No. 4,231,573 and discloses a high pressure laminate surface suitable for bowling alley lanes. These bowling lane surfaces have been successfully tested in the United States and been welcomed as an advance in the art. See e.g. *Bowling*, January, 1977 at page 6. One of the significant advantages afforded by the bowling lane laminates of the '604 application is a great reduction in fire and explosion potential. Nevertheless, these laminates are combustible.

SUMMARY OF THE INVENTION

1. Objects of the Invention

It will be seen from the above that there is a need for bowling lanes and surfaces, therefore, which are fire retardant, more resistant to physical abuse and wear, have uniformity of surface and which can maintain these qualities over a long period of time.

The bowling lane and surface described in the '604 application, assigned to the same assignee as this application responds, in part, to this need. Therein, there are disclosed particular decorative plastic laminates used to provide improved bowling lanes and surfaces therefor. Each bowling lane comprises a substrate selected from a group consisting of natural wood, consolidated wood fibers, plywood, flakeboard, chipboard and hardboard, and at least one decorative plastic laminate sheet secured to the surface of the substrate. The plastic laminate sheet comprises a plurality of thermosetting resin impregnated core sheets, a melamine resin impregnated decorative fibrous print sheet, an overlying melamine resin containing protective layer. The surface of the bowling lane so produced is characterized by a falling ball impact resistance of at least 60 inches, a coefficient of friction of about 0.18 and a Taber abrasion resistance of at least about 500 cycles.

The bowling lane and surface disclosed in the '604 application has made for a significant advance in the art. The present invention is considered to be an improvement on the invention of the '604 application and its main features and objectives are thus similar to the '604 application.

Experience gained in developing the invention of the '604 application has indicated the desirability of some improvements in product and method and has led to the conception and development of the present invention and the invention described in my concurrently filed U.S. patent application entitled "High Impact Resistant Laminate Surface for a Bowling Lane". In my concurrently filed U.S. patent application identified hereinabove, there is disclosed an improvement over the '604 application wherein the resin impregnated Kraft paper core sheets of the '604 application are replaced by an improved thermosetting resin impregnated core composed of alternating sheets of a glass cloth and crepe paper impregnated with thermosetting resins.

The present invention has, in addition to the advantages and features of the inventions disclosed in the '604 application and my concurrently filed U.S. patent application, flame retardant characteristics. The bowling lane and surface of the present invention possesses a high flame retardant characteristic while its crack-resistant laminate surface is not substantially weakened by the fire-retardant formulation employed.

It is, therefore, a primary objective of this invention to provide bowling lanes and surfaces for bowling lanes which are extremely resistant to cracking during usage thereof and have high flame retardant characteristics which comply with applicable Underwriter Laboratories flame retardancy test standards.

An object of this invention is to provide a fire retardant bowling lane laminate which is simple and economical to produce and which is not a fire hazard at a bowling alley.

Another object is to provide bowling lanes and surfaces therefor which incorporate glass cloth, crepe paper, thermosetting resins and fire retardant materials into the core of a laminate surface thereof.

Still another object of this invention is to provide a decorative plastic laminate which may be overlaid onto the surface of a wooden bowling lane to provide a new surface therefor having flame retardant characteristics while possessing superior impact resistance.

An object of this invention is to provide an interlaminar bond between fire retardant material and thermosetting resin impregnated layers of glass cloth and crepe paper which is as strong as the interlaminar bond between similar thermosetting resin impregnated layers of Kraft paper.

These and other objects will readily become apparent to those skilled in the art in the light of the teachings hereinafter set forth.

2. Brief Summary of the Invention

Briefly, according to the present invention, there are provided particular decorative plastic laminates having an improved thermosetting resin impregnated core comprised of a glass cloth-crepe paper laminate impregnated with a thermosetting resin and fire retardant formulations. The core is overlaid with a decorative layer and a protective thermosetting resin impregnated paper overlay or thermosetting resin overlay coating, each layer containing a fire retardant formulation.

DETAILED DESCRIPTION OF THE PREFERRED EMBODIMENTS

It has been found that the laminate surface described in the '604 application or my concurrently filed U.S. patent application, previously identified herein, may be made flame retardant by admixing flame retardant inorganic salts with the thermosetting resins which are impregnated into the paper fiber core sheets of my two aforementioned U.S. applications. It has also been discovered that the laminate could be made flame retardant by admixing flame retardant organic materials with the thermosetting resins which are impregnated into the glass cloth sheets in the core of the laminate of my concurrently filed U.S. patent application. Moreover, the laminate surface of the present invention has substantially the same thickness of the laminates of my two aforementioned U.S. applications.

When ammonium phosphate, for example, was incorporated into only the phenolic Kraft paper core sheets, flammability of the Kraft paper sheets was significantly retarded. However, since ammonium phosphate was not incorporated into the alternately spaced crepe phenolic sheets used in the laminate of my concurrently filed U.S. application, the fire retardant properties were not imparted thereto and the laminate as a whole remained potentially flammable. In addition, it was found to have poor impact resistance.

It has been found, however, that when flame retardant agents are added to the thermosetting (phenolic) resin which is used to impregnate both the Kraft and crepe paper sheets, impact resistance of the laminate surface was not reduced while flame retardancy was imparted to the laminate core. Depending upon the levels of flame retardant compositions added to the thermosetting resin, it is possible to produce laminates, according to this invention, which will extinguish themselves within a few seconds of ignition source removal or will not ignite at all; i.e., from a Class I (28-71) flame spread to a Class I (25 or less) flame spread according to the Underwriters' Laboratories test standards.

In addition to possessing the flame retardant properties, it has been found that bowling lane surfaces in accordance with the present invention are comparable in other respects to the bowling lane surfaces of the '604 application and have a NEMA Standard 8-19-64 falling ball impact resistance of over 60 inches as compared to 32 inches for a typical varnished or lacquered hardwood lane. When a 16-pound standard bowling ball was dropped on the bowling lane of this invention from a height of 3 feet, there was no effect. Both with polyurethane varnish and the nitrocellulose lacquer treated wooden bowling lanes, a deep surface dent resulted from such treatment and the wood fibers of the surface were torn. As measured by the Taber abraser, the NEMA Standard 8-20-1962 abrasion resistance of the present lanes is from about 500 cycles to 2500 cycles depending on the particular surface, whereas the polyurethane varnish and nitrocellulose lacquer finished lanes have a Taber abrasion resistance of 40 cycles and 25 cycles respectively. The resistance of the present surfaces to a burning cigarette in accordance with NEMA Standard 8-19-64 is 300 seconds as opposed to 90 seconds to charring for the polyurethane varnish and 24 seconds to burning with the nitrocellulose lacquer. The slip or coefficient of friction of the present surfaces is 0.18 as compared to 0.18 for typical polyurethane varnished layers and 0.16 for typical nitrocellulose lacquer coated lanes, all measurements being taken with an oil-treated surface. The present surfaces are furthermore resistant to staining by alcohol, detergent, shoe polish, and mustard whereas polyurethane varnished surface lanes are stained by mustard, and nitrocellulose lacquer surface lanes are stained by alcohol, shoe polish and mustard. The 60 degree gloss of the present lanes is also comparable to those of present hardwood lanes surfaced with nitrocellulose lacquer.

Any of a number of substrates can be used in connection with the surface of the present invention including natural wood such as maple planks and consolidated wood fibers, plywood, flakeboard, chipboard and hardboard. Also useful are materials such as concrete, cement-asbestos board, filled asphalt, stone and metal sheets, the non-flammable materials being useful where fire resistance is desirable.

The bowling lane surfaces or laminates of the present invention are readily made. The core sheets are alternately laid together and comprise crepe paper sheets alone or alternating with glass cloth or net sheets which can be impregnated with a thermosetting resin—flame retardant composition according to this invention. The thermosetting resins may be any of the thermosetting resins conventionally used in the production of decorative laminates. The most common of these resins is a condensation product of a phenol and an aldehyde, and are more specifically alkaline catalyzed phenol formaldehyde condensation products. A specific phenolic resin used in this connection is a light colored, thermosetting, general purpose phenol formaldehyde resin of the above description sold by the Monsanto Company under the name of Resinox 470. An epoxy resin may be employed to impregnate the glass sheets in lieu of a phenolic resin if desired. Suitable epoxy resins included the following: diglycidyl ethers of poly hydroxyl aromatic and alphatic alcohols, phenols and the like. The reaction product between the diglycidyl ether of bisphenol A and trimellitic anhydride is a preferred composition.

Suitable organic flame retardants which may be admixed with the thermosetting resins prior to their incorporation into the glass cloth or net core sheets include tris-(2,3-dibromopropyl phosphate, dibromobutenediol, brominated epoxy resins, chlorinated paraffins, tetrachloro phthalic esters and the like. Particularly preferred organic flame retardants are tetrabromo bisphenol A and brominated epoxy resins.

Suitable inorganic flame retardants which may be admixed with the thermosetting resins prior to their incorporation into the paper fiber core sheets include diammonium hydrogen phosphate, antimony oxide, sodium bromide, ammonium bromide and the like.

As in typical decorative laminates, the core sheets of creped Kraft paper or selected combinations of such papers are overlaid with a so-called print sheet which imparts the decorative effect as of wood grain or any other finish to the laminate. While the print sheet can be impregnated as is usual in ordinary decorative laminates, it has been found that a lesser amount than usual of the thermosetting resin impregnant is desirable in the print sheet to toughen the surface of the laminate and make it more impact and fracture resistant in order to resist grooving of the surface and denting. Any of a number of thermosetting resins can be used for impregnating the print sheet where this is indicated including, preferably, a condensation product of melamine and an aldehyde, such materials being characterized by excellent wearing, translucency and resistance to discoloring. A specific material found useful in this connection is a modified melamine formaldehyde reaction product sold by American Cyanamid Company under the name of Cymel 428. This resin is a white, free-flowing powder specifically designed for the treatment of paper to be used in decorative laminates. The resin is readily soluble in water or in alcohol-water solvents and gives a clear, colorless solution which is stable at 50 percent by weight solids content for at least two days at room temperature. Typical properties of a 50 percent aqueous solution of this resin at 25° C. include a pH of 8.8 to 9.6, a Gardener viscosity of A to B, a solids content at maximum dilution in water of 26 percent. However, other resins such as ureas, aminotriazines, light highly purified phenolic resins, polyester resins including unsaturated alkydvinyl monomer types, acrylics, ethoxyline resins and the like can also be used. Among the melamine resins which can be used are the several more fully described in U.S. Pat. No. 2,604,205. In preparing the plastic laminate, the alternating sheets of crepe paper and glass cloth or net in the core are impregnated in any desired manner with their respective thermosetting resins and dried, the resin content of the dried core paper sheet before consolidation ranging generally from about 34 to 37 percent by weight of resin for the normally used creped Kraft paper and from about 25 to 60 percent by weight of resin for the glass cloth or net.

Where a paper overlay or protective layer is used, this is normally of a highly purified, transparent, alpha cellulose although it can also consist of other transparent or highly translucent cellulosic or synthetic resin fibers such as those of rayon or mixtures of such fibers such as those described in U.S. Pat. No. 2,816,851, among others. This material is impregnated with a melamine resin such as the one described hereinabove and usually dried to a resin content of from about 33 to 42 percent by weight before consolidation.

If desired, the abrasion and wear resistance of the paper layer can be increased by incorporating abrasive materials such as finely divided silica, silicon carbide, emery, diamond, tungsten carbide, titanium carbide, boron nitride, aluminum oxide and mixtures of such materials with each other and with other finely divided materials, the wear or abrasion of the overlay being specifically tailored as desired by using materials of the desired hardness. These materials can be uniformly distributed throughout the overlay as by the teaching of U.S. Pat. No. 3,373,070, to give uniform abrasion resistance as the overlay is worn away or they can be concentrated in the surface of the overlay or graded through the thickness of the overlay as desired.

In lieu of the thermosetting resin impregnated paper overlay, there can be used a thermosetting resin as such or compositions which take the place of the overlay. Typical of such thermosetting resin composition overlays are those described in U.S. Pat. Nos. 3,135,643 and 3,371,071 which are included by reference herein. According to these patents, a surface coating composition for decorative laminates is provided comprising a thermosetting resin of silica flour and a finely divided fibrous material in the form of discrete fibers. The silica flour and the finely divided fibrous material have a refractory index approximating that of the cured thermosetting impregnating resin where a transparent or highly translucent effect is desired. It will be realized, of course, that the silica flour can be substituted wholly or in appropriate amounts by the other hard materials, including those mentioned above, to obtain good abrasion resistance and transparency effect. This coating composition greatly improves the abrasion resistance of the laminates to which it is applied.

The following examples illustrate at least one of the best modes of the method and products of the present invention as presently understood.

EXAMPLE 1

This example illustrates a fire retardant bowling lane having a decorative laminate surface incorporating a thermosetting resin impregnated paper overlay. There was prepared an overlay of alpha cellulose paper impregnated with a 50 percent water solution of melamine formaldehyde resin, specifically Cymel 428, the impregnated paper being dried to a resin content of 65 percent by weight. There was also prepared in a similar manner core layers of 130 pound basis weight kraft paper and 140 pound basis weight creped kraft paper which were impregnated with a formulation consisting of 10 percent by weight Fire Master LV-T23P, tris-(2,3 dibromopropyl) phosphate, with enough antimony oxide to provide stoichiometric $SbBr_3$, the balance of said formulation being a 50 percent solution of standard alkaline catalyzed phenol-formaldehyde resin, the dried resin content of each such core layer being about 30 percent by weight. The laminate was prepared by successively superimposing two phenolic containing formulation-impregnated kraft paper sheets, one phenolic containing formulation resin impregnated creped kraft paper sheet, thirteen phenolic containing formulation impregnated creped kraft paper sheets, one 55 pound basis weight raw or unimpregnated print sheet and a melamine resin impregnated overlay paper as described above. The laminate so laid up was placed between polished stainless steel panels and cured for 15 to 18 minutes at 130° to 135° at 1500 psi, the laminate then being cooled still under pressure to below 40° C. and removed from the press. Actually, the laminating process is of a time-temperature-pressure nature and can be prepared by curing for from about 20 to 25 minutes at from above 130° C. to 150° C. at pressures ranging from about 1000 psi to about 1500 psi. The resulting laminate was 130 mils thick and was sanded to a 125 mil thickness. As intimated above, the less melamine present in the print, the tougher the surface and the more impact and fracture resistant it is. Thus, in this example, a raw or unimpregnated print layer was used so that it could be impregnated but not excessively by reason of melamine resin migration from the melamine resin impregnated overlay paper. The finished laminate was cut into 2"×10" strips and evaluated in the vertical burn test. In the vertical burn test, the strips are hung from a clamp in a vertical configuration. A small flame (½ inch high) from a standard Bunson burner is applied 30 seconds and then removed. In general, it was found that the strips began to burn 20-30 seconds after application of the burner and extinguished themselves 0-20 seconds after removal of the burner. Most of the strips extinguished in 0-5 seconds, but those that flickered longer always did so on the back side where the crepe paper was predominant. The effectiveness of the organic material additives in retarding the flammability of the laminate was illustrated by this example.

EXAMPLE 2

The procedure of Example 1 was repeated with higher levels tris-dibromopropylphosphate (herein TP-23P) of Fire Master LV-T23P, used in the core sheets. The crepe Kraft paper resin was treated to produce 20 percent TP-23P on a resin solids basis and the Kraft paper resin was treated to produce 15 percent TP-23P on a resin solids basis. In both cases, enough antimony oxide to provide stoichiometric $SbBr_3$ was added. Laminates of the following construction were then pressed under the conditions described in Example 1:
1 melamine resin impregnated overlay
1 55-pound basis print sheet
8 resin formulation impregnated kraft paper sheets (15 percent T23P)
1 resin formulation impregnated kraft creped paper sheet (20 percent T23P)
1 epoxy resin impregnated glass sheet
1 resin formulation impregnated kraft creped paper sheet (20 percent T23P)
1 epoxy resin impregnated glass sheet
4 resin formulation impregnated kraft creped paper sheets (20 percent T23P)
1 resin formulation impregnated kraft paper sheet (15 percent T23P)

The laminate was cut into strips 10"×2"×0.140" and evaluated in the vertical burn test described in Example 1. There was some flaming 15-20 seconds after application of the burner, but in every instance, the laminates were extinguished instantly upon removal of the flame. This is consider excellent performance and e.g. in a circuit board laminate would be rated V-0.

These laminates were tested for impact by dropping a 16 pound bowling ball on them from heights of 2, 3 and 4 feet. There were no breaks at any height and the normally encountered denting was comparable to that encountered on a standard laminate as described in this example without the fire retardant additives. Also, there were no breaks after 2000 two-foot drops on the same spot.

EXAMPLE 3

Example 2 was repeated except that 5 percent by weight on solids dibromobutenediol (the maximum amount soluble) was added to the overlay and print resins. Essentially, the same results reported in Example 1 were obtained. There was no noticeable effect on the test measurement, even though it appeared to delay flaming of the face for a few seconds. Thus, this example illustrates that treatment of the print and overlay sheets would not be required according to this invention.

EXAMPLE 4

Standard 118 pound basis weight saturating kraft paper and 140 pound creped kraft paper were impregnated with the following formulations:

| KRAFT | | |
|---|---|---|
| | 50 percent solution of alkaline catalyzed phenol-formaldehyde resin | 625 lbs. |
| Methanol | | 62.5 lbs. |
| T23P | | 83.8 lbs. |
| $Sb_2O_3$ | | 32.3 lbs. |
| Resin Content | | 38.8 (35–40) |
| Volatile | | 6.9 (6.5–9.5) |
| Squeeze Out | | 2.9 (0.75–3.0) |
| CREPE | | |
| 13196 resin | (50% solution of standard alkaline catalyzed phenol-formaldehyde resin) | 718.5 lbs. |
| Methanol | | 39.6 lbs. |
| T23P | | 72.8 lbs. |
| $Sb_2O_3$ | | 27.9 lbs. |
| Resin Content | | 43 (32–37) |
| Volatile | | 4.5 (4.0–6.0) |
| Squeeze Out | | (0.06) |

The Kraft and creped Kraft papers were then used to press laminates according to the procedure described in Example 2. Although the crepe resin level was somewhat high, because of wrinkling at tight roll settings of the press employed, the performance of the laminate was not adversely affected thereby. The laminates were cut into strips and subjected to the vertical burn test as described in Example 2. Performance of these laminates was comparable to that of the laminates of Example 2 with respect to warp flame resistance and impact resistance.

EXAMPLE 5

A laminate was prepared as described in Example 2 and cut into 54 pieces 20"×96". 26 pieces were glued to Underwriters' Laboratories approved cement board using Penacolite G-1124 (an adhesive composition—4 parts adhesive—1 part formalin catalyst, commercially available from Koppers Company).

The adhesive was coated onto both the board and laminate using paint rollers to produce glue lines of 100-120 pounds per 1,000 square feet. The sections were then glued in a bag press and cured 16 hours at 70° F. under 20 p.s.i.

The samples were evaluated at Underwriters' Laboratories in the large scale tunnel test (ASTM E-84). The results were as follows: The flame spread was Class II (28-71) and the smoke generation was 450-1400. It should be noted that the test unit smoke sensor has no way of knowing the volume of material being burned. It records only the smoke density in the box.

EXAMPLE 6

A 108 pound basis weight, fire retardant Kraft paper treated with diammonium phosphate (commercially available from Westvaco) was further impregnated with a modified phenolic varnish. The modified phenolic varnish was a formulation consisting of 15% by weight T23P with enough antimony oxide to provide stoichiometric $SbBr_3$ the balance of said formulation being a 50 percent solution of standard alkaline catalyzed phenol-formaldehyde resin. After this modification, 10% powdered diammonium phosphate (based on the total resin) was dispersed in the mixture. Because of the low decomposition point of diammonium phosphate, 150° C., the treater oven temperatures were reduced to 145° C. maximum. Because of this, the volume of the treated sheets was higher (9%) than normal and in subsequent runs was 3-6% to provide better interlaminar bonds. The resin content was 35-36%; the volume was 8.8-9.1%, and the squeeze out was 1.6-2.3%.

The 140 pound basis weight creped Kraft paper described in Example 2 was used as modified with 20% T23P and a stoichiometric amount of antimony oxide. As described hereinabove in this example, 12% diammonium phosphate in powder form was added to the creped Kraft paper. The resin content was 39-42%; the volume was 4-6% and the squeeze out was 0.5-2.0%.

Laminates having the following composition were prepared according to the procedure described in Example 2:

| Unreinforced | Glass Reinforced |
|---|---|
| Overlay | Overlay |
| Print | Print |
| 17 Kraft | 9 Kraft |
| 2 Creped Kraft | 1 Creped Kraft |
| 1 Kraft | 1 Glass Epoxy |
| | 1 Creped Kraft |
| | 1 Glass Epoxy |
| | 4 Creped Kraft |
| | 1 Kraft |

The laminates were cut into sections ½"×96" and sent with similar laminates not containing the fire retardant compositions (as a control for testing at Underwriters' Laboratories (UL) in the ASTM-E-84 tunnel test). The fire retardant laminates produced were 0.160±0.005 inches thick and provided good impact resistance. The results of the UL tests showed that the flame spread was a Class I (25 or less) while the smoke generation was comparable to the results of Rxperiment 5. For a highly aromatic resin system and a laminate of this thickness, a high figure is understandable since the smoke test makes no provision for the mass of the sample burned.

EXAMPLE 7

The creped Kraft paper and Kraft paper described in Example 2 were treated with Antiblaze 78 (a chlorinated phosphate commercially available from Mobil Chemical Company) and a stoichiometric amount of antimony trichloride. The following four laminates were then pressed as described in Example 1 for a direct comparison of the two additives T23P and Antiblaze 78:

| | |
|---|---|
| (1) | 18 sheets of treated Kraft paper |
| (2) | 17 sheets of treated creped Kraft paper |
| (3) | Unreinforced Laminate |
| | Overlay sheet |
| | Print sheet |
| | 16 Kraft paper sheets |
| | 2 creped Kraft paper sheets |
| | 1 Kraft paper sheet |
| (4) | Four glass reinforced laminated |
| | Overlay sheet |
| | Print sheet |
| | 3 Kraft paper sheets |
| repeated 4 times { | Creped Kraft paper sheet / Epoxy glass sheet |
| | 5 creped Kraft paper sheets |
| | Kraft paper sheet |

The laminates were cut into strips 2"×10" and burned using the burner laboratory test. In each of the four types of laminates, flame spread results with Antiblaze 78 were comparable to those results obtained with T23P.

EXAMPLE 8

The following components were used to make laminates according to the procedure of Example 2:
 (1) An overlay sheet as described in Example 1
 (2) An overlay sheet as described in Example 1
 (3) A print sheet as described in Example 1
 (4) A 108 pound basis weight diammonium phosphate modified Kraft paper (commercially available from Westvaco Co.) treated with the following mix:

| 13347 phenolic varnish | 625.0 lbs. |
|---|---|
| Methanol | 62.5 lbs. |
| Antiblaze 78 | 83.7 lbs. |
| Antimony Oxide | 38.5 lbs. |
| Diammonium phosphate (powder) | 41.9 lbs. |

The mixture was stirred for 1-2 hours prior to treating. The target and actual resin volatile and squeeze out values are listed below:

| | Target | Actual |
|---|---|---|
| Resin content | 37-39 | 37-39 |
| Volatile | 3-6 | 7-9 |
| Squeeze-Out | 1-3 | 6-10 |

The higher volatile and squeeze-out was due to different treaters used having different size heating zones. This variance caused no problems. The squeeze roll settings were 0.011, the oven zone were 156° C. and 160° C., respectively, and the treating speed was 55 feet per minute.

(5) Creped Kraft paper—140 pound basis weight X-crepe (commercially available from Cincinnati Industries) was treated with the following mix:

| phenolic varnish | 697.5 lbs. |
|---|---|
| Methanol | 36.0 lbs. |
| Antiblaze 78 | 90.0 lbs. |
| Antimony oxide | 77.4 lbs. |
| Ammonium bromide(*) | 70.0 lbs. |
| Hot water | 70.0 lbs. |

(*)Dissolved in the water just prior to mixing. This mixture was allowed to stir 2–3 hours before treating. The target and actual resin volatile and squeeze-out values were as follows:

|  | Target | Actual |
|---|---|---|
| Resin content | 32–40 | 35–41 |
| Volatile | 4–6 | 5–9 |
| Squeeze-Out | 0.5–2.0 | 0.2–0.4 |

The squeeze roll settings on the treater were 0.019; the oven zones were both 154° C. and the treating speed was 31 feet per minute.

(6) A Glass Cloth—Weave 7628 glass cloth (commercially available from Burlington Industries) was treated with the following mixture:

| 13330 Epoxy resin | 542.0 lbs. |
|---|---|
| Acetone | 171.6 lbs. |
| Trimellitic anhydride | 65.0 lbs. |
| Antimony oxide | 111.8 lbs. |
| Antiblaze 78 | 130.0 lbs. |
| Tetramethyl guanidine | 234.0 grams |

The treated sheets are assembled into laminates according to the procedure described in Example 2 and when tested at Underwriters' Laboratories, gave a Class I flame spread.

What I claim as new and desire to secure by Letters Patent of the United States is:

1. In a bowling lane having a surface characterized by a falling ball impact resistance of at least 60 inches, a coefficient of friction of at least 0.16 and a Taber abrasion resistance of at least 500 cycles, said bowling lane comprised of a substrate selected from the group consisting of natural wood, consolidated wood fibers, plywood, flakewood, chipboard, and hardboard, and at least one decorative plastic laminate secured to the surface of said substrate, said plastic laminate comprising a plurality of thermosetting resin impregnated fibrous core sheets, a melamine resin impregnated decorative fibrous print sheet, and an overlying melamine resin containing protective layer, the improvement which comprises said fibrous core sheets being comprised of sheets of glass and paper, said glass being selected from the group consisting of woven glass cloth, glass net and glass scrim, the interlaminar bond strength between said glass and paper sheets being sufficient to prevent delamination of said glass and paper sheets upon impact with a dropped bowling ball from heights up to about 4 feet, said glass also being impregnated with an organic fire retardant material and said paper sheets also being impregnated with an inorganic fire retardant material.

2. A bowling lane as defined in claim 1 wherein said paper sheets are crepe paper sheets.

3. In a bowling lane having a surface characterized by a falling ball impact resistance of at least 60 inches, a coefficient of friction of at least 0.16 and a Taber abrasion resistance of at least about 500 cycles, said bowling lane comprised of a substrate selected from the group consisting of natural wood, consolidated wood fibers, plywood, flakewood, chipboard and hardboard, and at least one decorative plastic laminate secured to the surface of said substrate, said plastic laminate comprising a plurality of thermosetting resin impregnated fibrous core sheets, a melamine resin impregnated decorative fibrous print sheet, and an overlying melamine resin containing protective layer, the improvement which comprises said fibrous core sheets being comprised of sheets of glass and crepe paper, said glass being selected from the group consisting of woven glass cloth, glass net and glass scrim, said glass also being impregnated with an organic fire retardant material and said crepe paper sheets also being impregnated with an inorganic fire retardant material.

4. A bowling lane as defined in claim 3 wherein said organic fire retardant material is selected from the group consisting of tris-(2,3-dibromopropyl phosphate), dibromobutenediol and brominated epoxy resins.

5. A bowling lane as defined in claim 3 wherein said glass sheets are impregnated with an epoxy or phenolic resin.

6. A bowling lane as defined in claim 3 wherein said crepe paper sheets are impregnated with a phenolic resin.

7. A bowling lane as defined in claim 3 wherein each of said glass sheets is situated contiguously between two of said crepe paper sheets.

8. A bowling lane as defined in claim 7 wherein said glass sheets are situated between said crepe paper sheets in an alternating sequence.

9. A bowling lane as defined in claim 3 wherein said inorganic fire retardant material is selected from the group consisting of diammonium hydrogen phosphate, antimony oxide and sodium bromide.

10. A bowling lane as defined in claim 3 wherein the overlying protection layer is a fibrous sheet impregnated with the melamine resin and dibromobutenediol.

11. A bowling lane as defined in claim 3, wherein said overlying protective layer has abrasion resistance material incorporated therein.

12. A bowling lane as defined in claim 3, wherein the fibrous print sheet is paper.

13. In a bowling lane having a surface characterized by a falling ball impact resistance of at least 60 inches a coefficient of friction of at least 0.16 and a Taber abrasion resistance of at least about 500 cycles, said bowling lane comprised of a substrate selected from the group consisting of natural wood, consolidated wood fibers, plywood, flakewood, chipboard and hardboard, and at least one decorative plastic laminate secured to the surface of said substrate, said plastic laminate comprising a plurality of thermosetting resin impregnated fibrous core sheets, a melamine resin impregnated decorative fibrous print sheet, and an overlying melamine resin containing protective layer, the improvement which comprises said fibrous core sheets being comprised of sheets of glass and crepe paper, said glass being selected from the group consisting of woven glass cloth, glass net and glass scrim, the interlaminar bond strength between said glass glass and crepe paper sheets being substantially equal to the interlaminar bond strength between resin impregnated paper core sheets, said glass also being impregnated with an organic fire retardant material and said crepe paper sheets also being impregnated with an inorganic fire retardant material.

14. A bowling lane as defined in claim 13, wherein said organic fire retardant material is selected from the group consisting of tris-(2,3-dibromopropyl phosphate, dibromobutenediol and brominated epoxy resins.

15. A bowling lane as defined in claim 13 wherein said glass sheets are impregnated with an epoxy or phenolic resin.

16. A bowling lane as defined in claim 13 wherein said crepe paper sheets are impregnated with a phenolic resin.

17. A bowling lane as defined in claim 13 wherein each of said glass sheets is situated continguously between two of said crepe paper sheets.

18. A bowling lane as defined in claim 17 wherein said glass sheets are situated between said crepe paper sheets in an alternating sequence.

19. A bowling lane as defined in claim 13 wherein said inorganic fire retardant material are selected from the group consisting of diammonium hydrogen phosphate, antimony oxide and sodium bromide.

20. A bowling lane as defined in claim 13 wherein the overlying protection layer is a fibrous sheet impregnated with the melamine resin and dibromobutenediol.

21. A bowling lane as defined in claim 13, wherein said overlying protective layer has abrasion resistance material incorporated therein.

22. A bowling lane as defined in claim 13, wherein the fibrous print sheet is paper.

23. In a decorative plastic laminate of a length and width for securing to a substrate selected from the group consisting of natural wood, consolidated wood fibers, plywood, flakeboard, chipboard, and hardboard to form therewith all or part of a bowling lane having a surface characterized by a falling ball impact resistance of at least 60 inches, a coefficient of friction of about 0.16 and a Taber abrasion resistance of at least about 500 cycles, said plastic laminate sheet comprising a plurality of thermosetting resin impregnated fibrous core sheets, a melamine resin impregnated decorative fibrous print sheet, and an overlying melamine resin containing protective layer, the improvement which comprises:

said fibrous core sheets being comprised of sheets of glass and crepe paper, said glass being selected from the group consisting of woven glass cloth, glass net and glass scrim, said glass also being impregnated with an organic fire retardant material and said crepe paper also being impregnated with an inorganic fire retardant material.

24. In a decorative plastic laminate of a length and width for securing to a substrate selected from the group consisting of natural wood, consolidated wood fibers, plywood, flakeboard, chipboard, and hardboard to form therewith all or part of a bowling lane having a surface characterized by a falling ball impact resistance of at least 60 inches, a coefficient of friction of about 0.16 and a Taber abrasion resistance of at least 500 cycles, said plastic laminate sheet comprising a plurality of thermosetting resin impregnated fibrous core sheets, a melamine resin impregnated decorative fibrous print sheet, and an overlying melamine resin containing protective layer, the improvement which comprises:

said fibrous core sheets being comprised of sheets of glass and crepe paper, said glass being selected from the group consisting of woven glass cloth, glass net and glass scrim, the interlaminar bond strength between said glass and crepe paper sheets being substantially equal to the interlaminar bond strength between resin impregnated paper core sheets, said glass also being impregnated with an organic fire retardant material and said crepe paper also being impregnated with an inorganic fire retardant material.

25. The method of producing a bowling lane having a surface characterized by a falling ball impact resistance of at least 60 inches, a coefficient of friction of about 0.16 and a Taber abrasion resistance of at least about 500 cycles comprising:

impregnating a plurality of glass core sheets with a formulation comprised of a thermosetting resin and an organic fire retardant material;

impregnating a plurality of creped paper sheets with a formulation comprised of a thermosetting resin and an inorganic fire retardant;

laying said plurality of impregnated glass core sheets between said plurality of impregnated crepe paper core sheets in an alternative manner beginning with and ending with a crepe paper core sheet;

consolidating said impregnated core sheets, a resin impregnated decorative fibrous print sheet, and an overlying resin containing protective layer under heat and pressure to produce a unitary decorative plastic laminate sheet; and securing at least one such plastic laminate sheet to a substrate selected from the group consisting of natural wood, consolidated wood fibers, plywood, flakeboard, chipboard and hardboard to produce the desired bowling lane.

* * * * *